United States Patent Office 3,332,652
Patented July 25, 1967

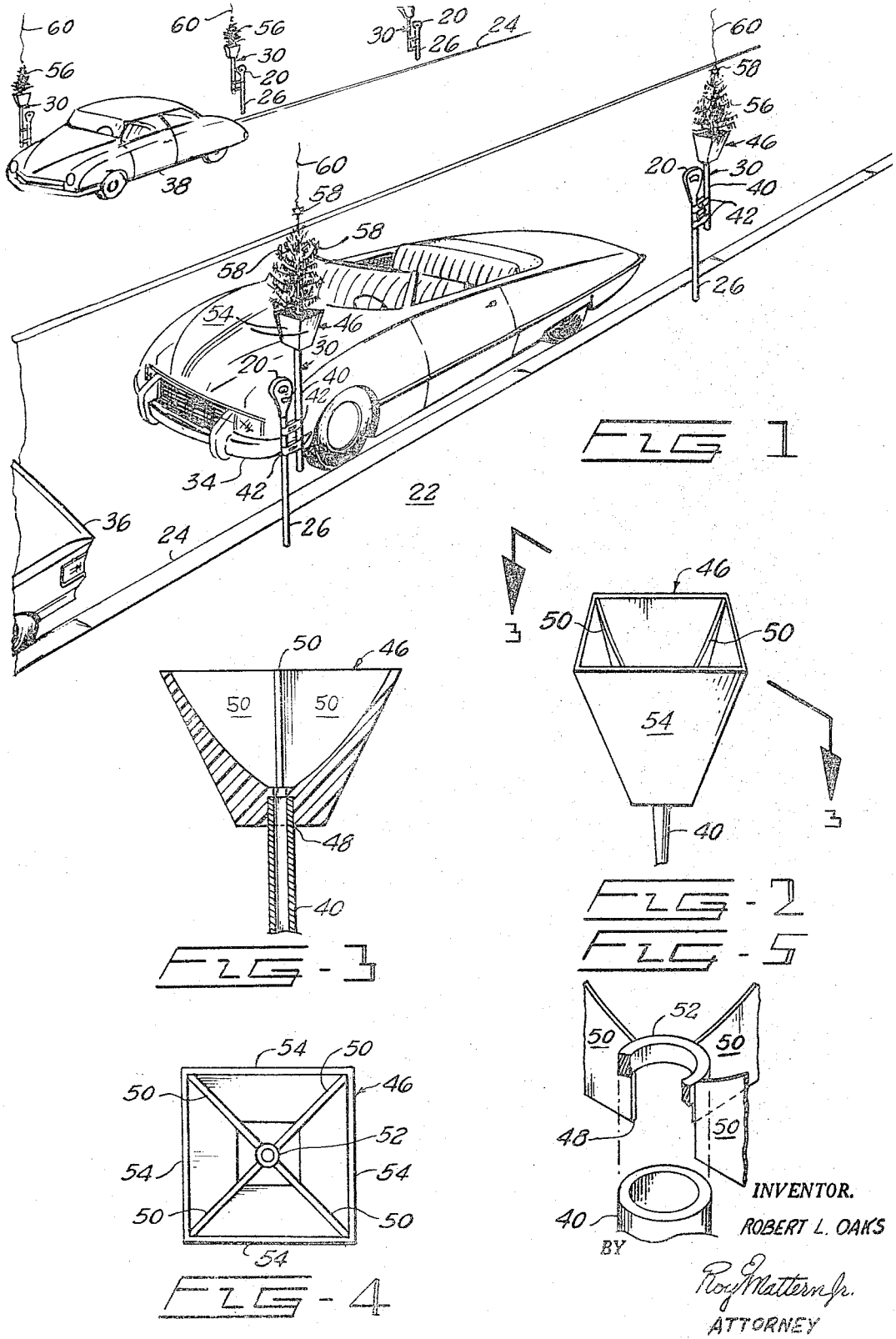

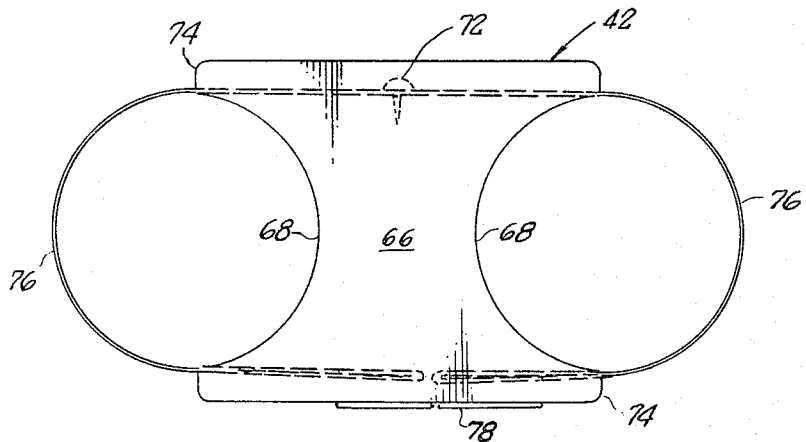
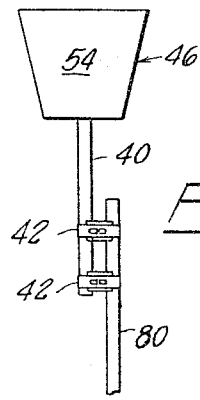
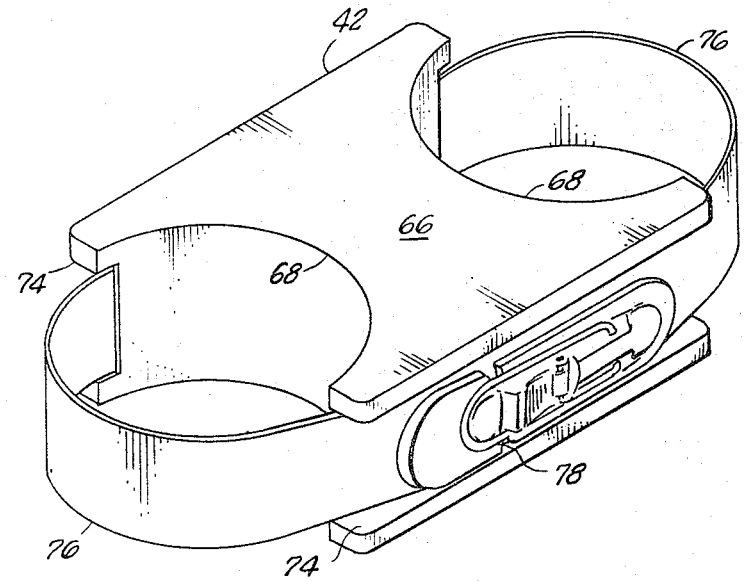

3,332,652
EQUIPMENT FOR SUPPORTING DECORATIONS
Robert L. Oaks, P.O. Box 850, Brookings, Oreg. 97415
Filed Oct. 18, 1965, Ser. No. 497,305
1 Claim. (Cl. 248—146)

This invention relates primarily to municipal decorations and more particularly to equipment which supports trees, shrubs, and flowers, such as lighted evergreen trees at holiday times, at selected elevated and spaced locations along municipal streets.

The purposes of the invention in providing supporting equipment are: to place decorative trees, shrubs and flowers at elevated but easily viewed spaced locations which are out of the way of vehicle and pedestrian traffic; to hold decorative trees, shrubs and flowers securely in presence of high winds and other possible disturbing forces, to place decorative trees, shrubs, and flowers and their possible illuminating equipment beyond reach of vandals; to receive electrical power for illuminating such decorative trees, shrubs and flowers from overhead power lines, thereby avoiding entanglements and possible shocks caused by and to persons moving about on street level; and to provide attachment means so this supporting equipment of decorative trees, shrubs and flowers may be quickly attached to and removed from sidewalk supported municipal structures such as parking meters, signs and lights.

An embodiment of this invention fulfilling these purposes is illustrated in the drawings, wherein:

FIGURE 1 is a perspective view of a city street indicating how supporting equipment for decorative trees, shrubs, and/or flowers may be in turn supported on parking meter;

FIGURE 2 is a perspective view of a top portion of the supporting equipment showing the container for decorative trees, shrubs and/or flowers;

FIGURE 3 is a sectional view along line 3—3 of FIGURE 2 of top portion of supporting equipment indicating how container is fitted to a supporting stanchion or post;

FIGURE 4 is a top view looking down into the supporting equipment showing structure of the container;

FIGURE 5 is a partial perspective view of both bottom portions of container and top portion of stanchion or post illustrating in more detail interfitting of the container to a stanchion or post;

FIGURE 6 is a top view of clamping and spacing bracket used, as illustrated in FIGURE 1, to secure decorative supporting equipment to a parking meter support;

FIGURE 7, is a side view of supporting equipment secured to a stanchion or post by clamping and spacing brackets; and FIGURE 8 is a perspective view of the clamping and spacing bracket shown in FIGURE 6, to illustrate its closure hardware.

In these figures, a preferred embodiment of the invention is illustrated which is directed to purposes indicated in FIGURE 1. In most towns and cities today municipal traffic control structures 20 such as parking meters are installed in sidewalks 22 near street curbs 24. These parking meter installations 20 make excellent commencing supporting structure 26 for decorative supporting equipment 30. In following this interconnection design approach, basic access of pedestrians to vehicles 34, 36, 38 and to stores (not shown) along a sidewalk is not further impaired beyond initial impairment caused by installation of such parking meters 20.

Supporting equipment 30 in this preferred embodiment, which is attached to parking meters 20 has a post or stanchion 40 of its own which often is like or similar to post 26 of parking meter 20. These respective posts 26 or stanchions 40, are preferably secured together by securing and spacing bracket assemblies 42, which are easily secured and removed, because this decoration supporting equipment 30 may be used only during holiday periods.

To this post 40, many decorations could be secured such as flag equipment (not shown). However, for purposes of illustration, container 46 is shown fitted to top of post 40 using its own lower central recess 48, which is determined by four ribs 50 and single ring 52 structural design of a container 46 having sloping sides 54 forming a larger top opening than its bottom as illustrated throughout FIGURES 1, 2, 3 and 4.

In this container may be placed cut or growing trees 56, shrubs or flowers as illustrated in FIGURE 1. Such ultimate decoration may be directly lighted, for example, by lights 58 strung around trees 56. When this lighting decoration is undertaken, electrical leads 60 are preferably and conveniently suspended from nearby overhead wires (not shown), which are available in most municipalities. Such raised elevation of lighted decorations 58 and overhead leads 60 reduces danger of hot wires during storms, avoids vandalism with respect to destruction of lights 58. Where overhead utility wiring may not be available, battery powered lighting systems (not shown) could be included within each supporting structure 26 and preferably be supported by container 46.

Illustrated in FIGURES 6, 7 and 8 is attachment of decorative supporting equipment 30 to parking meter supporting structure 26, by use of securing and spacing bracket assemblies 42. These assemblies 42 have a center body 66 which serves, collectively, as a spacer, post receiving means 68 at its opposite ends, an anchor at fastener 72, and guide means 74 to position clamping band 76 with its associated toggle latch 78.

By using securing and spacing bracket assemblies 42, as shown in FIGURES 1 and 7, decorative supporting equipment 30 is selectively arranged at various heights and at surrounding positions about parking meters 20. Once secured equipment remains in position withstanding high wind forces. Yet, when a holiday or vacation period commences or is over, such decorative supporting equipment 30 is readily attached and detached upon manipulation of toggle latch 78. For dead and in transit storage, handling and packing of bracket assemblies 42, posts 40, and partial nesting containers 46, can all be undertaken very conveniently and economically. The parts are interchangeable when repairs and replacements become necessary.

Although the drawings have illustrated utilization of a parking meter 20 assembly for its commencing supporting structure 26, other types of commencing supporting structures, such as sign posts (not shown), could be utilized. Moreover, in absence of such pre-existing commencing supporting structures along a street, a longer supporting post, in lieu of post 40, could be used directly with a sidewalk supported base (not shown) or recess (not shown) thereby eliminating any need for clamping bracket assemblies 42. Or, as indicated in FIGURE 7, a supporting lower section post 80 could be used where no parking meters were installed. Use of lower posts 80, avoids handling and storage of longer supporting posts which might be used in lieu of these two unit supports illustrated in FIGURE 7.

Whatever specific structural forms may be followed in providing this decorative supporting equipment 30, the purposes remain to provide a firm, out of the way, neat appearing assembly of supporting members which can be erected and taken down quickly and handled and stored economically to lower decorative costs while enhancing the beauty of these decorations. Many materials are used such as wood, fiber glass, plastics and metal for respective components.

I claim:

In combination with a parking meter and its stanchion, supporting equipment for positioning ornaments and decorations, such as color lighted trees, over pedestrian walkways adjacent to streets, comprising:

(a) parking meter and its stanchion;
(b) a substantially pot-like hollow container having an enlarged top opening to receive portions of a tree and having a bottom with a lower accessible smaller opening;
(c) a vertical support having its top fitted into the lower opening of the container and having a length which extends below into an overlapping, side by side, slightly spaced relationship with the parking meter stanchion; and
(d) a fastening means adapted to secure the vertical support to the parking meter stanchion where they overlap, to thereby hold the container with its lighted tree in an upright position above the sidewalk and parking meter, this fastening means having a spacing body to partially receive and space both the vertical support and the stanchion and an encompassing wrapping band snapped into place with its toggle latch to releasably secure the spacing body and the wrapping band to both the vertical support and the stanchion.

References Cited

UNITED STATES PATENTS

| | | | |
|---|---|---|---|
| 585,486 | 6/1897 | Snow | 248—146 X |
| 1,288,839 | 12/1918 | Conrad et al. | 248—313 |
| 1,877,098 | 9/1932 | Washburn | 248—146 |
| 2,686,029 | 8/1954 | Raymond | 248—41 |
| 2,701,699 | 2/1955 | Chapin | 248—44 |
| 2,705,603 | 4/1955 | Bitz et al. | 248—43 |
| 3,232,567 | 2/1966 | Mastenbrook | 248—44 |

FOREIGN PATENTS 975,673   10/-950   France.

CHANCELLOR E. HARRIS, *Primary Examiner.*

CLAUDE A. LE ROY, *Examiner.*